Patented Feb. 25, 1941

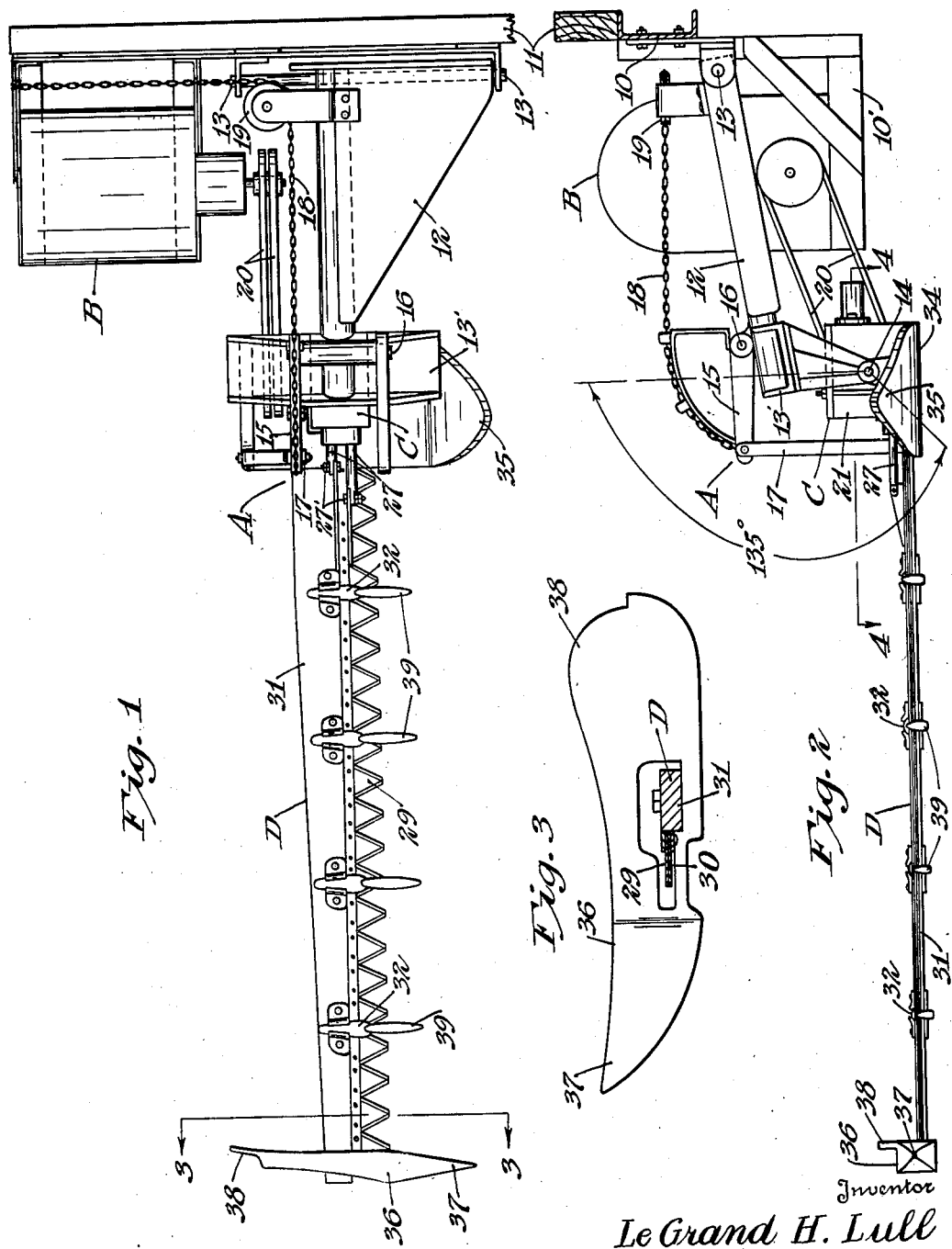

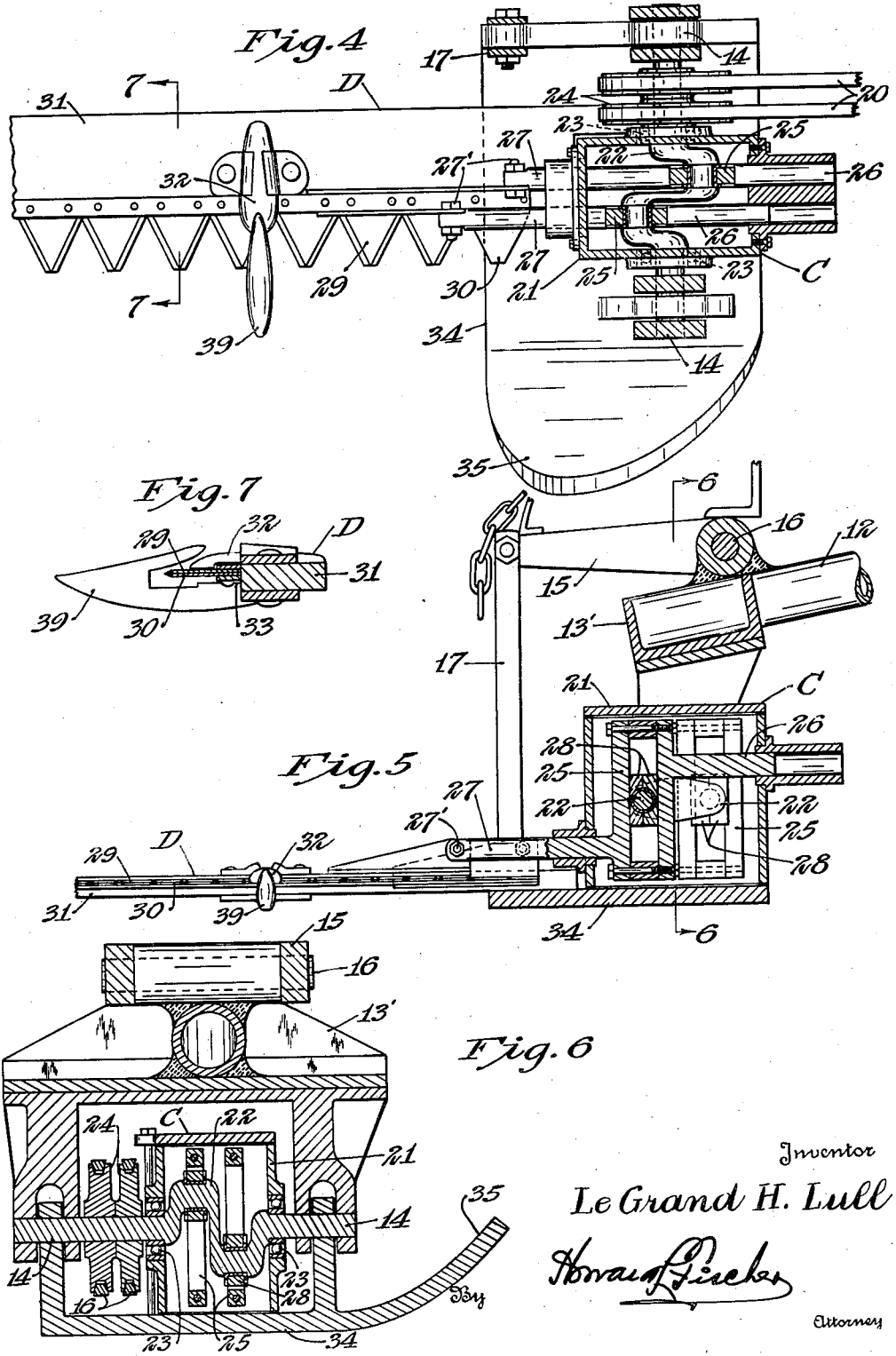

2,232,823

UNITED STATES PATENT OFFICE 2,232,823

SICKLE ADJUSTING MECHANISM

Le Grand H. Lull, Minneapolis, Minn.

Application February 13, 1937, Serial No. 125,628

1 Claim. (Cl. 56—283)

This invention relates to high speed adjustable road shoulder sickle and operating head for road maintenance wherein it is desired to provide a sickle having a substantial strong construction and provided with a means of adjustment to a greater angle than has been accomplished heretofore. In a sickle for cutting weeds and grass along the shoulders of a road, it is necessary that the same operate at a higher speed than ordinary sickles and that the sickle bar be adjustable in a downwardly sloping angle away from the pavement to permit the cutting of the vegetation over the shoulder. This adjustment I have accomplished in my sickle operating head.

It is also a feature to provide a road maintenance sickle which is portable on a truck, that is, a highway truck, and which may have its own power unit to operate the sickle independent of the truck. The truck which carries my portable sickle unit acts as the vehicle for moving the sickle along over the road, whereas, the power unit in one form of the sickle is provided as a self-contained unit with the sickle operating head.

My high speed adjustable road shoulder sickle and operating head includes a casing which forms the covering for the operating head and in which a crankshaft is provided having a double offset portion which is adapted to carry the operating yoke in which the crosshead slides, the crosshead being secured on a suitable bearing on the offset portions of the crankshaft. I provide the yoke with drive shafts at the top and bottom so as to form suitable guides for steadying the crosshead and forming suitable bearings which permit the crankshaft to be operated at high speed. Connected to the lower bearing shaft extending from the yoke, are the links which connect directly to the sickle knives. There are two sickle knives, one above the other, which reciprocate back and forth in close proximity to each other, so as to provide clipping teeth with sharp cutting edges which pass each other to clip off the vegetation as the sickle bar is carried along over the ground.

It is a feature to provide a strong, substantial support for the sickle knives, which permit the knives to operate freely in slide bearings. The sickle knives are made up of a series of V-shaped teeth, having sharpened edges which are removable on the main supporting bar. I also provide guide shoes which permit the outer free end of the sickle bar to ride along on the outer guide shoe as a skid, whereas, the inner guide shoe is adjacent the casing of the operating head to support the sickle knives on both ends and permit the same to slide freely over the ground.

It is a feature to provide the inner skid member of the operating head with an upwardly turned guiding end toward the forward portion, or the direction of travel of the sickle, and this plate is adapted to provide a protecting means for the under surface of the operating head. The head for operating the sickle bars, together with the supporting bracket and arms for adjusting the position of the sickle bar, are all supported above the skid shoe which projects under the operating head and which are protected by the same.

The important feature of my sickle which is adapted to operate at high speed is to provide an adjustment so that the blade with its operating head may tilt into a wide range of angles and may be readily adjusted into the different angular positions when being operated over the road or shoulder of a highway. I provide a pivoting bracket means for the operating head and sickle which are connected together as a unit, so as to give a range of 135° or more. This permits the operating sickle to be dropped down to a low angle, of, for example, 45° below horizontal and also permits it to be raised into vertical position without affecting the operation thereof.

The supporting bracket and frame for the sickle and operating head are adapted to support a power unit which holds the power unit in close proximity to the operating head, making a short drive through V-belts or other driving means, to the operating head. This whole unit is supported to the under frame of a vehicle or truck so that it can be readily moved along a highway to cut away the grass or vegetation on the shoulders of the road. Heretofore sickles have been made, but they were not properly adjustable to the desired angle and they had to operate at slow speed.

Thus it will be apparent that I have provided a unitary portable high speed adjustable road shoulder sickle, operating head and power unit for driving the same, which may be underslung on a regular highway truck, and removably attached to the same so that when it is desired, the unit may be removed in its entirety. These features provide a high speed road maintenance sickle having outstanding characteristics and features.

In the drawings:

Figure 1 is a plan view of my high speed adjustable road shoulder sickle operating head and power unit, showing the same attached to a beam which may represent a portion of a highway truck.

Figure 2 is a front elevation of the same.

Figure 3 illustrates the outer skid shoe for the free end of the sickle bar, as a section, taken on the line 3—3 of Figure 1.

Figure 4 is an enlarged sectional plan detail on the line 4—4 of Figure 2, of a portion of the sickle unit, showing the casing of the operating head in section.

Figure 5 is a front elevation partially in section, of the detail shown in Figure 4.

Figure 6 is a section on the line 6—6 of Figure 5.

Figure 7 is a section on the line 7—7 of Figure 4.

The drawings illustrate my high speed adjustable portable sickle unit A which is provided with a power motor B for supplying power to operate the sickle knives through the operating head C which is adapted to support the sickle bar D.

The unit A is provided with a supporting frame 10 which is attached in a suitable manner to the beams 11 beneath the highway truck or vehicle (not illustrated in the drawings). The frame 10 includes a supporting shelf portion 10' upon which the motor B which may be an electric motor or which may be a gas engine unit, is mounted.

A supporting bracket 12 is pivotally attached at 13 to the frame portion 10 and on the outer end of this bracket I provide a supporting frame 13' which is adapted to pivot at 14 the operating head C of the sickle bar D. By means of a suitable quadrant bracket 15, which is pivoted at 16 to the top of the frame 13', together with the brace arm 17, the sickle bar D may be adjusted through the operating chain 18. The chain 18 extends over the pulley 19 and may be extended to an operating position in the vehicle so that the sickle bar D may be raised and lowered about the pivot point 14. The adjustment of the sickle bar by this means permits the operating head C and the sickle bar unit to be collectively moved into different angular positions in relation to the ground so that the sickle bar D may be adjusted to the slope of the shoulder on either side of the highway to permit the sickle bar to cut away any vegetation which projects above the ground.

These features are important details of my unit A because they provide a practical means of adjusting the sickle bar D to the desired position in relation to the ground during the operation of the sickle bar, and they also permit the raising of the sickle into a vertical position when it is not mowing. I believe the adjustment of the head C with the sickle bar D, as a unit, is of a new construction which is very important in that it provides a means of easy adjustment of the sickle bar D without changing the relation of the motor B which is adapted to operate the crankshaft of the head C for operating the knives of the sickle. This construction permits drive belts 20, which may be of the V-type, to remain in proper adjustment to operate the sickle in any angle that may be desired. Thus in the adjustment of the sickle bar D, the driving belts 20 are not effected by the movement of the sickle bar into different positions. The motor B is adjustable upon the shelf 10' to set the same in position to give the desired tension to the driving belts 20. Therefore, with this new construction, the belts 20 will remain taut for a long period of time.

The sickle operating head C is formed with a casing 21 through which the double offset crankshaft 22 extends. The ends of the double offset crankshaft 22 are mounted in suitable ball-bearings 23 in the casing 21 and extend out to form the pivot points 14 at each end which permits the swinging of the head C and the sickle bar D as heretofore set forth. Operating pulley means 24 receive the drive belts 20 from the motor B. Within the casing 21 a pair of yokes 25 are mounted by the bearing shafts 26 and 27 which extend into the bearings formed in the casing 21 and which permit the yokes 25 to reciprocate horizontally by the operation of the crankshaft 22 which supports the sliding blocks 28 and causes the same to reciprocate vertically within the yokes 25 during the rotation of the crankshaft 22 to operate the yokes horizontally in the operating head C. The guide shafts 27 are adapted to be pivotally connected at 27' to the upper and lower sickle knives 29 and 30, respectively. The sickle knives 29 and 30 are slidably mounted upon a strong beam 31 of the sickle bar assembly and are held in place by upper guide members 32 and lower guide members 33. This beam 31 is secured to the head C and is elevated slightly above the skid shoe bottom 34 which forms the bottom of the head C and which is provided with an upwardly curved nose portion 35 extending in the direction of travel of the sickle over the ground. This skid shoe 34 is formed of a wide, flat nature along its bottom, and tends to protect the head C and permit it to slide along on the ground and act as a guide for the inner end of the sickle bar D.

The outer end of the sickle bar D is adapted to be supported by the skid guide shoe 36 which acts as a runner to guide the outer end of the bar D, holding it elevated from the ground the desired distance and having a pointed guiding nose portion 37 which curves upwardly away from the ground line. The rear end of the shoe 36 is of a blade-like nature at 38 which permits the shoe 36 to slide through the vegetation and to protect the outer end of the sickle bar D.

The knives 29 and 30 are formed with V-shaped teeth which are sharpened at their edges and which lie virtually against each other and are adapted to slide back and forth like scissor-blades, excepting that they extend in line with each other and are reciprocated rapidly back and forth by the operation of the crankshaft 22 which is operated by the motor B through the belts 20. The operation of the sickle knives is protected by the forwardly projecting guard teeth 39, any number of which may be provided and which act also as guides in which the sickle knives 29 and 30 may operate.

The operation of my high speed portable road maintenance sickle A is such that it may be operated in conjunction with a highway truck or vehicle to which the unit is attached and may be moved along the highway rapidly, mowing away the vegetation in front of the sickle. The sickle bar D is adjustable very readily into the desired position to cut down along the sloping shoulders of the road, and the operation of the sickle is maintained uniform at any angle through the construction and mounting of the same. The sickle unit is underslung or hung closely to the ground, giving a more desirable operation, and is sufficiently strong and well braced so as to operate in a desirable manner.

In double knife sickles which have been used heretofore, the structure has been of the ordinary type, operated by the pitman rod and the crankshaft of the ordinary, old, simple type, however, such constructions would not be practical for road maintenance and could not be used where speed is essential in the operation as the sickle travels along the highway. Thus I have designed my high speed sickle unit which is adjustable as a unit including the sickle bar and supporting means, together with the operating head in which the peculiarly shaped and balanced yokes which are carried in substantial bearings, are adapted to operate in a sealed compartment in which the lubricant is free to contact the different bearings and parts, so that a high speed may be maintained in the operation of the unit A.

A further feature of accomplishment in my high speed road maintenance sickle resides in the close coupling of a power unit which gives a positive drive to the operating head. Then there is also the protective skid means for the operating head and the pivoting of the operating head in position so that it may be adjusted with the bar readily to the different angles desired. Further, the adjustment of the operating head with the sickle bar and supporting means as a unit, in no way affects the driving means from the power unit. Thus while the sickle is traveling it may be adjusted into different angular positions without stopping the operation of the sickle knives. These features are of importance and accomplish new results with the sickle construction of my design wherein more efficiency is accomplished in mowing down vegetation on the shoulders of highways and the like, at a speed which is desirable to prevent clogging of other traffic.

In accordance with the patent statutes, I have described the principles of operation of my high speed road maintenance sickle unit. The illustrations and description are of a character to set forth the form and construction which are desirable; it should be apparent, however, to those skilled in the art, that variations may be made within the scope of the following claim without departing from my invention.

I claim:

A sickle comprising a road engaging shoe, a sickle blade extending therefrom, means for pivotally mounting said shoe for pivotal adjustment of said shoe and sickle blade, a substantially vertical link pivotally connected to said shoe at a point laterally spaced from said pivotal mounting means, a lever pivoted above the level of said shoe and pivoted to said link, a quadrant mounted upon said lever, and flexible means extending about said quadrant and operable upon longitudinal movement thereof to pivot said lever to move said link to pivot said shoe and sickle blade about said pivotal mounting means.

LE GRAND H. LULL.